Patented Jan. 14, 1936

2,028,103

UNITED STATES PATENT OFFICE 2,028,103

ANTHRIMIDE CARBAZOLE VAT DYESTUFFS AND PROCESS OF PREPARING THE SAME

Donald P. Graham, South Milwaukee, Wis., assignor to E. I. du Pont de Nemours & Company, Wilmington, Del., a corporation of Delaware No Drawing. Application June 3, 1933, Serial No. 674,220

12 Claims. (Cl. 260—46)

This invention relates to vat dyestuffs of the anthraquinone-carbazole series. It is an object of this invention to provide an improved process for manufacturing the ring-closed fusion product of 1,4,5,8-pentanthrimide, whereby to obtain a khaki dyestuff of improved shade and purity. Other and further important objects of this invention will appear as the description proceeds.

In German Patent No. 262,788 of 1913 there is described a method for producing an olive-green vat dyestuff by fusing with aluminum chloride pentanthrimide, that is, tetra-$\alpha$-anthraquinonyl-1,4,5,8-tetramino-anthraquinone. The procedure set forth therein consists of heating 5 parts of $\alpha$-pentanthrimide with 20 parts of aluminum chloride at 270° C. and recovering the dyestuff from the resultant cake. It is stated therein that the product changes shade but little and shows no changes at all in other properties upon treatment with sodium hypochlorite.

I have now found that a dyestuff of considerably brighter and greener shade and of improved qualities in general is obtained if the fusion is conducted under considerably milder conditions than those indicated in the patent, and the fusion product then subjected to oxidation, for instance, by the aid of an alkali metal dichromate and dilute sulfuric acid.

Whether the product of my improved process is chemically distinct from the dyestuff disclosed in the above German patent, or whether it is merely obtained in a higher state of purity is rather difficult to determine. The dyeings upon cotton, nevertheless, show a distinct difference in shade. The dyeings by the product of said German patent are of a greyish-olive shade, whereas those by my novel product are of a bright, yellow-olive or khaki shade.

The mild conditions above mentioned have reference in general to all those factors which are known to influence the rate or extent of reaction. They include first of all the employment of lower temperatures for the reaction; secondly, dilution of the fusion mass with inert salts, such as sodium chloride; thirdly, shortening the time of heating; and fourthly, a rearrangement in the manner of adding the reactants to each other.

I have found it more advantageous to feed the pentanthrimide gradually into the molten aluminum chloride rather than mix the reactants jointly before fusion. I have also found it profitable to add a carbonate to the pentanthrimide in order to assist in the agitation and intimate mixing of the reactants.

For best results, the temperature near the final stages should be in the neighborhood of 175–200° C. Higher temperatures may be used without affecting the quality of the resulting dyestuff, but its yield is thereby decreased.

The sodium chloride acts as a flux, and helps maintain a molten state at the low temperature desired. The quantity of sodium chloride should therefore be at least sufficient to enable fusion of the mass at a temperature between 175 and 200° C. Generally, 8 to 25% by weight of the aluminum chloride give good results.

The carbonate, usually an alkali-metal carbonate, is mixed with the pentanthrimide and fed in together therewith slowly into the aluminum chloride melt. Its object is to produce local agitation (by liberating $CO_2$ gas) at the point of contact of the pentanthrimide with the aluminum chloride, thereby insuring almost instantaneous contact, preventing accumulation of pentanthrimide on the surface of the mass.

Without limiting my invention to any particular procedure, the following example, in which parts by weight are given, will serve to illustrate my preferred mode of operation.

Example 1 part of alpha-pentanthrimide is intimately mixed with 0.3 to 0.7 part of soda ash, and added slowly to a melt made up of 8 to 15 parts of aluminum chloride and 0.8 to 1.2 parts of sodium chloride at a temperature of 180–190° C. When addition is complete, the charge is held at 180–190° C. for a few minutes and then drowned in 30 to 60 parts of water, filtered, and washed. The cake is then slurried in about 50 parts of 10–20% sulfuric acid solution, and about 1 part of sodium dichromate is added. The mixture is heated to 90° C. and held at 90–95° C. for about five hours. An excess of dichromate is maintained by further additions if necessary. When the oxidation is completed, as shown by the fact that no further dichromate is being absorbed, the charge is filtered, washed, and made into a paste.

The product so obtained dyes cotton from a red vat in yellow-olive shades of superior brightness and more yellow in shade than the product described in German Patent No. 262,788. The solubility of the new product in the vat is also superior to that of the product described in the German patent. My novel dyestuff apparently consists of substantially pure α-pentanthraquinone-tetracarbazole of the formula:

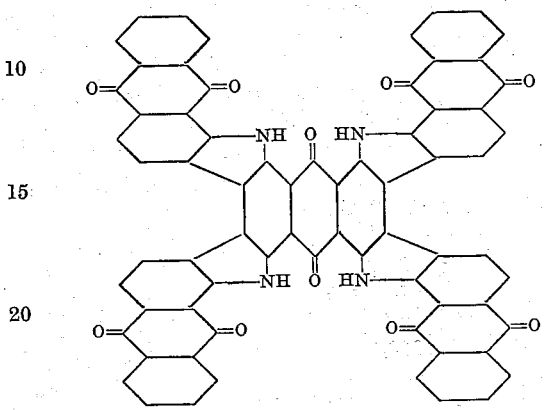

It will be understood that many variations and modifications are possible in the details of procedure, without departing from the spirit of this invention. For instance, in lieu of soda ash, other carbonates may be used, provided the metal (or metallic radical) is such that its chloride is water soluble, and passes into the filtrate when the mass is drowned. Instead of sodium chloride, potassium chloride or any other flux may be employed to maintain a fluid state at the reduced temperature of the melt. If desired, the filter cake before the oxidation step may be subjected to vatting and reprecipitation to reduce it physically to a fine state of subdivision. It is of course to be understood that there is no clear break in the reaction at 200° C., although at temperatures materially above 200° the yield of the desired dyestuff is decreased and the shade is noticeably altered. I therefore use the expression "not materially above 200° C." in the claims to include those temperatures which although somewhat above 200° give essentially the same results as are obtained when the reaction is carried out at 175–200°. The elevation of temperature above 200° C. is material if at such temperature the yield of the dyestuff is impaired or its shade noticeably altered.

The intermediate alpha-pentanthrimide employed as initial material in my process may be prepared as follows:

1,5-dinitro-4,8-dichloro-anthraquinone is heated in trichlorobenzene, and chlorine is passed in until the two nitro groups have been replaced by chlorine atoms. The mass is then cooled, and the crystallized 1,4,5,8-tetrachloro-anthraquinone is filtered off and washed. This is then reacted in the ratio of 1 to 4 moles with alpha-aminoanthraquinone in a medium of nitro-benzene, in the presence of an acid absorbing agent and a copper catalyst, to give alpha-pentanthrimide.

I claim:

1. A process of producing a vat dyestuff, which comprises fusing pentanthrimide with aluminum chloride at temperatures not materially above 200° C. and subjecting the product to oxidation.

2. A process of producing a vat dyestuff, which comprises feeding pentanthrimide gradually into a melt containing aluminum chloride and an alkali-metal halide at a temperature between 175 and 200° C., and subjecting the fusion product to oxidation.

3. A process of producing a vat dyestuff, which comprises feeding gradually a mixture of pentanthrimide and an alkali-metal carbonate into a melt comprising as the essential ingredients aluminum chloride and sodium chloride at a temperature between 175 and 200° C., and subjecting the fusion product to oxidation.

4. A vat dyestuff substantially identical with the product obtained according to claim 3, said dyestuff dyeing cotton in bright, yellowish-olive shades.

5. A process of producing a vat dyestuff, which comprises feeding gradually a mixture of pentanthrimide and sodium carbonate into a melt comprising as the essential ingredients aluminum chloride and sodium chloride at a temperature between 175 and 200° C., drowning the reaction product in water, recovering the precipitated dyestuff, and subjecting the same to oxidation by means of sodium dichromate in dilute sulfuric acid.

6. In the process of preparing an olive vat dyestuff by fusing alpha-pentanthrimide with aluminum chloride, the improvement which comprises carrying out the reaction at temperatures not materially above 200° C.

7. In the process of preparing an olive vat dyestuff by fusing alpha-pentanthrimide with aluminum chloride, the improvement which comprises conducting the reaction at a temperature not exceeding 200° C.

8. In the process of preparing an olive vat dyestuff by fusing alpha-pentanthrimide with aluminum chloride, the improvement which comprises effecting the fusion in the presence of an alkali-metal halide.

9. In the process of preparing an olive vat dyestuff by fusing alpha-pentanthrimide with aluminum chloride, the improvement which comprises effecting the fusion in a melt of aluminum chloride containing from 8 to 20% by weight sodium chloride.

10. In the process of preparing an olive vat dyestuff by fusing alpha-pentanthrimide with aluminum chloride, the improvement which comprises feeding the pentanthrimide gradually into the aluminum chloride melt in the presence of a carbonate.

11. In the process of preparing an olive vat dyestuff by fusing alpha-pentanthrimide with aluminum chloride, the improvement which comprises feeding a mixture of pentanthrimide and sodium carbonate into a melt composed of aluminum chloride and sodium chloride.

12. In the process of preparing an olive vat dyestuff by fusing alpha-pentanthrimide with aluminum chloride at temperatures not materially above 200° C., the improvement which comprises oxidizing the resultant dyestuff by the aid of an alkali-metal bichromate in dilute sulfuric acid.

DONALD P. GRAHAM.